3,377,247
ANTIDEPRESSANT METHOD
John N. Eble, Indianapolis, Ind., assignor to The Dow Chemical Company, Midland, Mich., a corporation of Delaware
No Drawing. Filed Apr. 28, 1967, Ser. No. 634,496
6 Claims. (Cl. 167—65)

ABSTRACT OF THE DISCLOSURE

A method of alleviating symptoms of depression in animals by administering to animals suffering from such symptoms an antidepressant amount of 3-[(2-imidazolin-2-yl)methyl]-indole, or a pharmaceutically acceptable salt thereof.

---

This invention is concerned with a method and compositions for treating depression in animals and is particularly directed to a method and compositions for treating depressed mammals by the administration of an antidepressant amount of 3-[(2-imidazolin-2-yl)methyl]-indole or a pharmaceutically-acceptable salt thereof.

It is an object of the invention to provide a method for the treatment of depression in animals. It is another object of the invention to provide novel pharmaceutical compositions which can be employed to alleviate symptoms of depression in mammals. It is a further object of the invention to provide pharmaceutical compositions comprising an antidepressant compound of high potency. Further objects and advantages will become apparent upon consideration of the following specification and claims.

It has been found that 3-[(2-imidazolin-2-yl)methyl]-indole and the pharmaceutically-acceptable salts thereof have powerful antidepressant activity when administered to depressed animals, and in particular, to depressed mammals. As employed herein, the phrase "pharmaceutically acceptable salts" refers to non-toxic acid addition salts of 3-[(2-imidazolin-2-yl)methyl]-indole, the anions of which are relatively innocuous to the animal at dosages consistent with good antidepressant activity so that the beneficial effects of the free base are not vitiated by side effects ascribable to the anions. Appropriate pharmaceutically-acceptable salts include those derived from mineral acids such as hydrochloric, hydrobromic, sulfuric and nitric acid, from organic carboxylic acids such as maleic, succinic, citric and acetic acid and organic sulfonic acids such as methanesulfonic acid and toluenesulfonic acid.

3-[(2-Imidazolin-2-yl)methyl]-indole, hereinafter referred to from time to time as "substituted indole," is a crystalline solid melting at 129°–131° C. which is soluble in a variety of organic solvents such as chlorinated hydrocarbons, chlorinated benzenes and alkylbenzenes and only slightly soluble in water. The pharmaceutically-acceptable salts of the substituted indole compound are crystalline solids which are soluble in water and slightly soluble in organic solvents such as halobenzenes and alcohols.

The substituted indole compound can be prepared by the reaction of 3-indolylacetonitrile with ethylenediamine monotosylate according to know procedures for preparing 2-substituted 2-imidazolines. In a convenient procedure, the reactants are contacted and mixed in an inert organic solvent such as 1,2-dichlorobenzene and the mixture is heated at the boiling point under reflux for a few hours. The 3-[(2-imidazolin-2-yl)methyl]-indole product precipitates in the reaction mixture as the tosylate salt and can be separated and purified by conventional procedures such as filtration and washing followed by recrystallization. The free base substituted indole compound can be liberated from the tosylate salt by conventionel procedures. It is generally convenient to mix an aqueous solution of the salt with aqueous sodium hydroxide to liberate the free base, which can then be extracted with chlorinated hydrocarbon solvents and separated by evaporation of the solvent. The pharmaceutically-acceptable salts of the substituted indole compound can be conveniently prepared by dissolving the substituted indole compound in an alcohol and adding an excess of an alcoholic solution of an acid such as hydrochloric acid to precipitate the pharmaceutically-acceptable salt. The salt can be separated by filtration and purified by recrystallization.

In accordance with the invention, an antidepressant amount of 3-[(2-imidazolin-2-yl)methyl]-indole or a pharmaceutically-acceptable salt thereof is administered to a depressed animal. The term "depressed animal" as employed herein refers to an animal which is exhibiting symptoms of depression. Such symptoms can be ordinary symptoms of central nervous system depression such as decreased spontaneous motor activity and decreased responsivenes to auditory, visual or tactile stimuli, for example. These symptoms can be the result of physiological or pathological conditions or can be brought about by pharmacological effects such as the administration of a central nervous system depressant or of a compound having depressant side effects.

In the practice of the invention, the substituted indole compound is normally incorporated in a pharmaceutical carrier and the resulting composition is administered internally to a depressed animal. In the present specification and claims, "pharmaceutical carrier" refers to known pharmaceutical excipients which are substantially non-toxic and non-sensitizing at dosage levels consistent with good antidepressant activity. The active ingredient is preferably administered orally in the form of solid compositions which can be prepared by known techniques such as tableting and encapsulation. Suitable pharmaceutical carriers which can be employed for formulating such compositions include starch, lactose, glucose, sucrose, gelatin, powdered licorice, malt, rice flour, chalk, silica gel, magnesium carbonate, magnesium stearate and the like and compatible mixtures thereof. The substituted indole compound and the pharmaceutically acceptable salts thereof can also be formulated as liquid compositions including syrups, elixirs, suspensions and emulsions for oral administration. The substituted indole compound and its pharmaceutically acceptable salts can also be administered by injection in the form of sterile injectable compositions for intraperitoneal or subcutaneous administration, for example. Among the liquid pharmaceutical carriers which can be employed are ethanol, water, saline, glucose syrup, syrup of acacia, mucilage of tragacanth, propylene glycol, polyethylene glycols, peanut oil, wheat germ oil, sunflower seed oil or corn oil and the like and compatible mixtures thereof. Emulsions are prepared with the aid of emulsifying agents such as lecithin, sorbitan trioleate, polyoxyethylene sorbitan monooleate and natural gums such as gum acacia and gum tragacanth. Suspensions are prepared with the aid of suspending agents such as polyethylene oxide condensation products of alkylphenols or fatty acids or fatty alcohols, or cellulose derivatives such as methyl cellulous, carboxymethyl cellulose or hydroxypropylmethyl cellulose. The compositions can also contain sweetening agents such as calcium cyclamate, flavoring agents such as caramel, coloring materials, preservatives and the like.

The antidepressant amount of the substituted indole compound to be administered to a depressed aniimal can vary depending upon such factors as the severity of the symptoms exhibited, the method of administration, whether or not the free base or a pharmaceutically acceptable salt of the substituted indole compound is employed and the particular animal being treated. In general, it is preferred to administer the compound at a dosage rate of from about 30 micrograms per kilogram to about 3000 micrograms per kilogram of animal body weight per day. Such dosages can be administered by single or multiple doses provided that the compound is administered in an amount to substantially alleviate symptoms of depression. When the active ingredient is administered orally as in the form of tablets or capsules, it is preferred to employ compositions in dosage unit form containing the substituted indole compound in an amount between about 2 and about 300 milligrams per unit. When the active compound is administered by procedures such as intraperitoneal or subcutaneous injection, it is preferred to employ sterile injectable compositions in dosage unit form containing from about 2 to about 300 milligrams of the substituted indole compound per unit.

In general, the compositions of the invention contain from about 0.05 to about 90 percent of the substituted indole compound in a pharmaceutical carrier.

The following examples illustrate the invention but are not to be construed as limiting the same.

EXAMPLE 1

Antidepressant activity of the substituted indole compound was indicated by reversal of reserpine-induced depression in rats. Reserpine was administered to each of three groups of rats at a dosage rate of 5 milligrams per kilogram by intraperitoneal injection. The administration of the reserpine to the rats resulted in a progression of signs starting with drooping of the eyelids (ptosis) and pilo-erection and culminating in a generalized depression with decreased spontaneous motor activity and decreased responsiveness to auditory or tactile stimuli. One hour following the administration of reserpine, two of the groups of rats were administered 3-[(2-imidazolin-2-yl)methyl]-indole by intraperitoneal injection at dosage rates of 100 and 500 micrograms per kilogram, respectively. The third group of rats was left untreated to serve as a check. Following the administration of the substituted indole compound, the test animals were observed for the above signs of depression. The rats in both groups which were administered 3-[(2-imidazolin-2-yl)methyl]-indole were found to exhibit increased spontaneous motor activity and increased responsiveness to stimuli amounting to hyperexcitement. The rats administered the substituted indole compound were also observed to exhibit no ptosis, but instead, to exhibit exopthalmos (protrusion of the eyeball). These observations indicate a reversal of reserpine-induced depression in the treated rats. The rats in the control group continued to exhibit symptoms of depression.

EXAMPLE 2

3-[(2-imidazolin-2-yl)methyl]-indole was administered to separate groups of mice at various dosage rates orally or by intraperitoneal injection. One hour after the dose of the substituted indole compound, reserpine was administered to each mouse at a dosage rate of 5 milligrams per kilogram by intraperitoneal injection. The administration of 5 milligrams per kilogram of reserpine intraperitoneally to mice results in a progression of signs starting with drooping of the eyelids (ptosis) and pilo-erection and culminating in a generalized depression with decreased spontaneous motor activity and decreased responsiveness to auditory and tactile stimuli.

Following the administration of the reserpine, the test animals were observed for the above signs of depression. A reversal of reserpine depression was indicated when the mice were observed to exhibit increased spontaneous motor activity and increased responsiveness to stimuli. The dosage of 3-[(2-imidazolin-2-yl)methyl]-indole effective to reverse reserpine depression in 50 percent of the mice (ED 50) was calculated. The compound was found to have an oral ED 50 of 230 micrograms per kilogram and an intraperitoneal ED 50 of 60 micrograms per kilogram. Responses such as those observed as a result of the foregoing tests have been found to be characteristic of compounds which are known to be useful for combating depression in animals (Annals of the New York Academy of Sciences, vol. 60, art. 3, pp. 551–1046, 1959).

In other operations, groups of mice were administered 3-[(2-imidazolin-2-yl)methyl]-indole at various dosage rates by either intraperitoneal injection or oral administration to determine intraperitoneal injection or oral administration to determine toxicity of the substitued indole compound. In these operations, the dosage of the compound sufficient to be lethal in 50 percent of the mice tested (LD 50) was calculated. The LD 50 for intraperitoneal injection of 3-[(2-imidazolin-2-yl)methyl]-indole was found to be 22 milligrams per kilogram, and the LD 50 for oral administration was found to be 52 milligrams per kilogram. Thus, the substituted indole compound has a therapeutic index (LD 50/ED 50) of over 225 for oral administration and over 350 for intraperitoneal injection.

EXAMPLE 3

The procedure of Example 2 was repeated with other groups of mice, with the sole variation being that the animals were held for three hours rather than one hour before the administration of reserpine. In these operations, the ED 50 for reversal of reserpine-induced depression by 3-[(2-imidazolin-2-yl)methyl]-indole was calculated to be 500 micrograms per kilogram when administered orally and 350 micrograms per kilogram when administered by intraperitoneal injection.

EXAMPLE 4

Ten grams of 3-[(2-imidazolin-2-yl)methyl]-indole, 625 grams of milk-sugar, 12 grams of magnesium stearate and 363 grams of corn starch are intimately mixed together in conventional mixing apparatus. The mixture is filled into gelatin capsules in the amount of one gram per capsule. The capsules are thus adapted to provide a dosage of 10 milligrams of the active ingredient to depressed animals.

Three grams of 3-[(2-imidazolin-2-yl)methyl]-indole, 40 grams of lactose, 45 grams of starch and 5 grams of powdered tragacanth are mixed intimately in conventional apparatus. The mixture is filled into gelatin capsules in the amount of 200 milligrams per capsule and the capsules are then administered internally to animals exhibiting symptoms of central nervous system depression.

EXAMPLE 5

One gram of 3-[(2-imidazolin-2-yl)methyl]-indole is intimately mixed with 50 grams of magnesium stearate, 450 grams of alginic acid and 1050 grams of corn starch and the mixture is compressed into slugs. The slugs are broken into granules which are passed through an eight mesh screen and mixed with an additional 50 grams of magnesium stearate. The mixture is then compressed into tablets weighing 3.5 grams each. The tablets are administered to animals in a state of depression.

EXAMPLE 6

350 milliliters of ethanol are diluted with 650 milliliters of polyethylene glycol-200 (a polyhydric alcohol having an average molecular weight of about 200). One gram of 3-[(2-imidazolin-2-yl)methyl]-indole is dissolved in the alcohol-polyethylene glycol mixture and the mixture is filtered, poured into vials, sealed and sterilized. Intraperitoneal injection of one cubic centimeter of this composition to a depressed animal provides a dosage of one milligram of the active ingredient.

EXAMPLE 7

2.5 grams of 3-[(2-imidazolin-2-yl)methyl]-indole dihydrochloride are dissolved in 100 cubic centimeters of normal saline solution containing 0.5 percent of chlorobutanol as a preservative. The solution is filtered, filled into vials, sealed and sterilized in an autoclave to obtain a sterile injectable composition. One cubic centimeter of the composition contains about 25 milligrams of the active ingredient. The composition is administered to animals exhibiting symptoms of depression.

I claim:
1. The method which comprises administering to an animal exhibiting symptoms of depression an antidepressant amount of a member of the group consisting of 3-[(2-imidazolin-2-yl)methyl]-indole and the non-toxic pharmaceutically-acceptable acid addition salts thereof.
2. The method of claim 1 wherein the compound is 3-[(2-imidazolin-2-yl)methyl]-indole.
3. The method of claim 1 wherein the compound is administered at a dosage rate of between about 30 and 3000 micrograms per kilogram of animal body weight.
4. A composition comprising a pharmaceutical carrier having incorporated therein an antidepressant amount of a member of the group consisting of 3-[(2-imidazolin-2-yl)methyl]-indole and the non-toxic pharmaceutically-acceptable acid addition salts thereof.
5. A composition in dosage unit form adapted for administration to depressed animals, said composition comprising a pharmaceutical carrier having incorporated therein between about 2 and 300 milligrams per unit of a member of the group consisting of 3-[(2-imidazolin-2-yl)methyl]-indole and the non-toxic pharmaceutically-acceptable acid addition salts thereof.
6. The composition of claim 5 wherein the compound is 3-[(2-imidazolin-2-yl)methyl]-indole.

References Cited

UNITED STATES PATENTS 2,751,393   6/1956   Schindler _____ 260—309.6

ALBERT T. MEYERS, *Primary Examiner.*

S. FRIEDMAN, *Assistant Examiner.*